May 9, 1961  A. B. SKROMME  2,983,059
HYDRAULIC MOTOR ASSEMBLY
Filed April 29, 1957
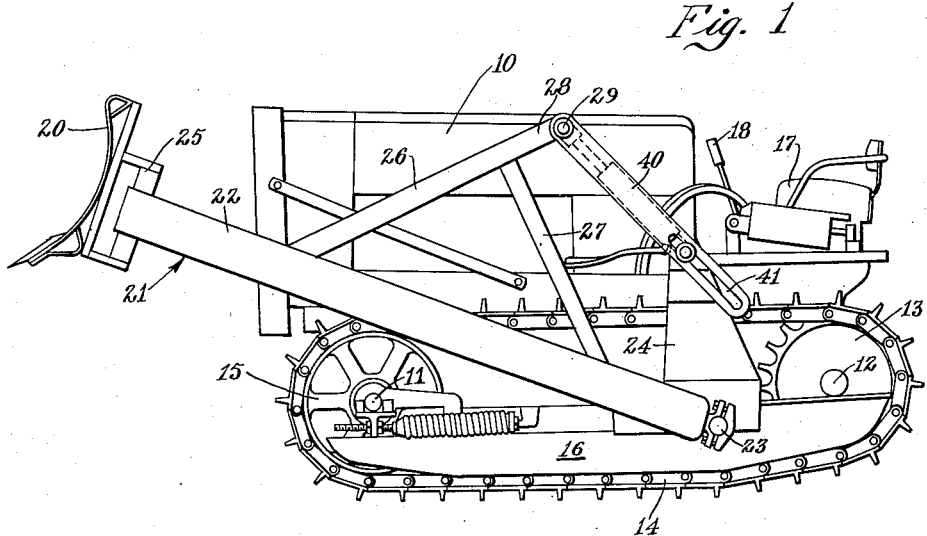
Fig. 1
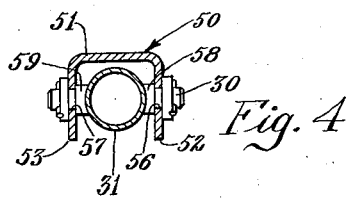
Fig. 4
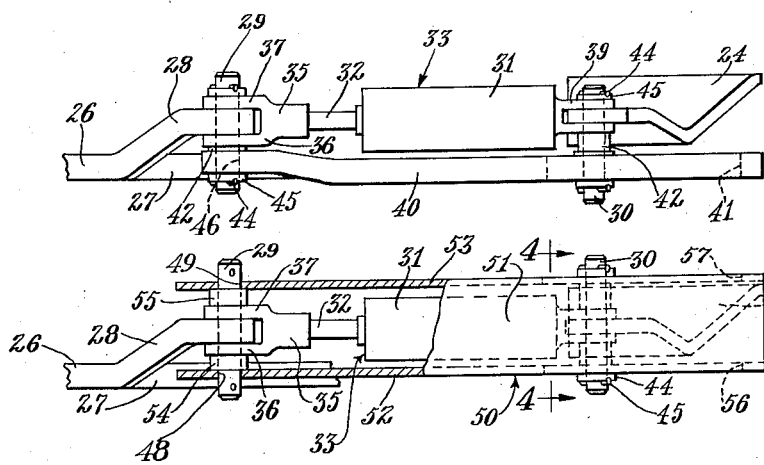
Fig. 2
Fig. 3
INVENTOR.
A.B. Skromme
BY
Attorneys

United States Patent Office 2,983,059
Patented May 9, 1961

2,983,059
HYDRAULIC MOTOR ASSEMBLY

Arnold B. Skromme, Moline, Ill., assignor, by mesne assignments, to Deere & Company, a corporation of Delaware Filed Apr. 29, 1957, Ser. No. 655,647

6 Claims. (Cl. 37—144)

This invention relates to an earth moving piece of equipment and more particularly to the hydraulic means which operates to adjust the positioning of the earth mover. Still more particularly the invention relates to a shield or guard adjacent to the hydraulic cylinder which prevents damage to the cylinder.

Typical of present day type earth movers is a bulldozer positioned forwardly of a tractor. The blade is connected to the tractor by means of a U-shape frame extending around the front of the tractor and having fore-and-aft extending arms positioned on opposite sides of the tractor with their rear or free ends pivotally mounted on the tractor frame for vertical movement. Vertical adjustment of the blade is created by a pair of hydraulic units anchored on opposite sides of the tractor and having ram ends pivotally connected to upright frame structures fixed to the aforesaid arms of the U-shaped frame.

A problem which exists in this type of bulldozer is that the hydraulic cylinders are normally exposed to material falling on the tractor. A common usage of bulldozers and other types of earth moving equipment is the uprooting of trees which, when falling, might contact the hydraulic motor or cylinder. Likewise, when the bulldozer is being operated in relatively narrow limits, projections or obstructions might project over the arms of the bulldozer frame and contact the hydraulic cylinder. In either case, damage could occur to the cylinder to the extent that the bulldozer would be forced to shut down for repair as well as requiring a replacement of the damaged cylinder.

It may be noted that this condition is probably somewhat peculiar to earth moving equipment inasmuch as this type of equipment is one of the few which would create circumstances in which the hydraulic cylinders would need to be safe guarded.

It is therefore the primary object of this invention to provide a simple shield for the hydraulic cylinders which operate to raise and lower the earth mover so as to protect the cylinders from fallen debris or from projecting obstructions.

It is also an object of this invention to provide a shield for the above purpose of a simple and novel nature which will permit extension or retraction of the ram and cylinder without effecting the shielding effect of the shield. The shield will be formed from a single rigid piece and will be pivotally mounted on the connections between the hydraulic motor and the arms of the bulldozer frame and the tractor frame respectively. At one of the connecting points a slot will be provided to accommodate extension or retraction of the ram within the cylinder.

Other objects and advantages of the invention will become apparent to those skilled in the art as the nature of the invention is better understood from the following description as illustrated in the accompanying drawings.

Fig. 1 is a side elevation of a tractor and bulldozer assembly which incorporates the features of the present invention.

Fig. 2 is a plan view of the hydraulic motor and its shield and their connection to the frame structures of the bulldozer and tractor respectively.

Fig. 3 is a partial sectional and plan view, similar to Fig. 2, showing a modification of the invention.

Fig. 4 is a sectional view taken along the line 4—4 of Fig. 3.

For purposes of illustration the present invention is shown in conjunction with a front mounted bulldozer and track-laying tractor assembly. It should, however, be understood that other types of earth moving equipment as well as other types of vehicles would provide suitable environment for the invention.

The tractor is composed of a fore-and-aft extending elongated body 10 supported on front and rear axles 11 and 12 respectively. On the rear axle 12 is a track driving sprocket 13 over which is mounted a track 14. The forward end of the track extends over an idler sprocket 15 journaled to the front axle 11. Track rollers, not shown, are mounted on the tractor behind a shield 16 and operate to maintain the track 14 in engagement with the ground. An operator's station is characterized by a tractor seat 17 on which an operator may be stationed to manipulate levers, as at 18, for operating the tractor as well as the bulldozer. These as well as other characteristics of the tractor are standard with conventional track-laying tractors and further details are not necessary for complete and full understanding of the invention.

The bulldozer is composed of two main parts, an earth mover or bulldozer blade 20, and the supporting structure 21 which mounts the earth mover on the tractor. The supporting structure 21 is of conventional design and includes a U-shaped frame having a cross piece extending across the forward end of the tractor and a pair of rearwardly extending arms, the arm at the left of the tractor being indicated by the reference numeral 22, and connected at their rear ends on horizontal pivots, as at 23 which permit the U-shaped frame 21 to be moved vertically. An upright frame structure 24 is fixed to the frame of the tractor and extends upwardly from a position outboard of the tracks 14. The cross piece of the U-shaped frame 21 is connected to the bulldozer blade 20 by means of connecting structure 25. Generally speaking, the structure for mounting the U-frame 21 on the right side of the tractor is identical to that on the left side of the tractor and likewise the hydraulic system for raising and lowering the bulldozer blade 20 is identical on both sides of the tractor; consequently, description of such will herein be limited only to that shown on the left side of the tractor.

Fixed to the arm 22 and extending upwardly therefrom is an upright A-frame portion composed of front and rear converging frame members 26, 27, respectively. The frame member 26 projects rearwardly beyond the point of convergence, as at 28, and is provided at its rear end with a transverse pin or shaft 29 which serves as part of a clevis 10 connecting the hydraulic unit and the bulldozer assembly. The upright frame structure 24 is also provided with an opening at its upper end for receiving a transverse pivot pin or shaft 30 which serves as part of a clevis connecting the hydraulic unit 33 to the tractor assembly. The upright frame portions 24 and 28 may therefore be treated as support elements for the hydraulic unit 33. The hydraulic motor or unit 33 is composed of a hydraulic cylinder 31 and an associated piston or ram 32 which reciprocates axially relative to the cylinder 31. The forward or free end of the ram 32 is connected to the clevis pin 29 by means of a yoke or clevis member 35 having forwardly extending bifurcated legs 36, 37 with openings therein for receiving the transverse pin 29. The legs 36, 37 extend on opposite sides of the frame extension 28. A bifurcated clevis member 39 is fixed to the cylinder 31 and extends rearwardly to have its furcations adjacent to and on opposite sides of the upright frame 24. The bifurcated member 39 is provided with a pair of transversely aligned openings for receiving the clevis pin 30.

Outboard of the hydraulic unit 33 is a rigid elongated shield or guard member 40 substantially parallel to the axis of the cylinder 31. The forward end of the shield 40 is provided with an aperture for receiving the pivot pin 29. The opposite or rear end of the shield 40 is provided with a slot 41 which receives the pivot pin 30 and which accommodates relative movement between the shaft members upon extension or retraction of the hydraulic unit. For obvious reasons the slot 41 must be at least equal to the length of the stroke of the hydraulic motor. A spacer 42 is provided on the pin 30 to maintain a sufficient distance between the inner surface of the shield 40 and the outer surface of the bifurcated member 39. A spacer 43 is provided at the forward end of the shield for purposes of maintaining an axial distance between the leg 36 and the shield 40. The pivot pins 29, 30 are held in their position by means of cotter pins and washers as at 44 and 45 respectively. As is clearly shown in Fig. 1 the height of the shield 40 is slightly larger than the diameter of the hydraulic cylinders 31. Consequently, any material falling over the shield 40 would normally not contact the hydraulic unit.

It will be noted in Fig. 1 and Fig. 2 that the shield 40 is supported at all times on the A-frame and on the upright structure 24 which is rigidly fixed to the tractor frame. Extension or retraction of the ram 32 is effective to move the pivot pin 30 along the slot 41. Consequently, the hydraulic cylinder may be extended or retracted to any position and the shield 40 will at all times offer maximum protection for the cylinder and ram since it is supported independent of the cylinder. Therefore an object falling against the shield 40 would have its force of impact carried directly by the structures 21 or 24 and not in any way by the hydraulic motor.

In the modification shown in Figs. 3 and 4 identical structure as in the previous form of the invention is shown by the identical reference numbers. In the modification the shield member 50 has a U-shaped cross section having a laterally extending portion 51 and a pair of depending side portions 52 and 53. The shield 50 opens to the bottom and fits over the hydraulic motor. The forward end of the side portions 52, 53 are provided with openings or apertures 48, 49 for receiving the pin 29. Between the legs 36, 37 of the yoke 35 and the respective side portions 52, 53 are spacer members 54, 55 respectively. The rear portion of the shield 50 is provided with elongated slots 56, 57 in the side portions 52, 53 which receive the transverse pivot pin 30. Similar to the previous form of the invention, the slots 56, 57 must at least be the length of the stroke of the ram. Suitable spacers 58, 59 are provided between the bifurcated member 39 and the respective side portions 52, 53. The modified form of the invention operates in the manner similar to the previous form in that the entire shield is carried by the A-frame of the structure 21 and the structure 24 at all times. The modified form offers greater protection for the cylinder, although a shield in the form shown in Figs. 1 and 2 would in most instances be sufficient. In addition, the shield 40 of the first form offers additional advantages both costwise and in the simplified manner of mounting.

While only one modification of the invention has been shown, it should be recognized that other forms and modifications would undoubtedly occur to those skilled in the art. Therefore, while the invention has been shown and described in considerable detail for the purpose of clearly and concisely illustrating the principles of the invention, it is desired not to so limit or narrow the invention beyond that which is claimed.

What is claimed is:

1. A hydraulic unit assembly comprising: spaced apart support elements movable relative to one another; a hydraulic unit including a cylinder and an associated piston mounted in the cylinder having a free end axially outward of the cylinder; first means including a shaft member transverse to the axis of the cylinder connecting the cylinder to one of the spaced apart support elements; second means including a shaft member transverse to the axis of the cylinder connecting the free end of the piston to the other of the spaced apart support elements; a rigid elongated guard member adjacent to the hydraulic unit having an aperture at one end for receiving one of the shaft members; and slot means at the opposite end of the guard for receiving the other of the shaft members for accommodating relative movement between the shaft members upon extension or retraction of the hydraulic unit, said guard member having a width greater than the diameter of the cylinder with opposite edges thereof extending beyond the opposite sides of the cylinder.

2. The invention defined in claim 1, in which the guard member is of U-shaped cross section having a lateral portion above the hydraulic unit and a pair of depending side portions on opposite sides of the hydraulic unit.

3. The invention defined in claim 2, in which said one end of the guard member is anchored by the shaft member of said first means to one of the support elements and the slot means at the opposite end of the guard member is an elongated slot formulated by at least one of the side portions whereby the shaft member of said second means may extend through the slot, and said slot will accommodate movement of the latter shaft member upon extension or retraction of the hydraulic unit.

4. In a bulldozer-tractor assembly in which the tractor has a main frame and the bulldozer a bulldozer frame anchored to the main frame for vertical movement, and each of said frames includes an upright portion in fore-and-aft spaced apart relation to the other upright portion; a hydraulic unit bridging the space between the upright portions for raising and lowering the bulldozer frame including a cylinder and an asociated piston mounted in the cylinder and having a free end axially outward of the cylinder; means including a shaft member transverse to the axis of the cylinder connecting the cylinder to one of the upright portions; means including a shaft member transverse to the axis of the cylinder connecting the free end of the piston to the other of the upright portions; and a rigid elongated guard member adjacent to the hydraulic unit having an aperture at one end for receiving one of the shaft members and a slot at the opposite end receiving the other of the shaft members for accommodating relative movement between the shaft members upon extension or retraction of the hydraulic unit, said guard member having an upper edge above and outward of the upper peripheral surface of the cylinder.

5. In a bulldozer-tractor assembly in which the tractor has a main frame and the bulldozer a bulldozer frame anchored to the main frame for vertical movement, and each of said frames includes an upright portion in fore-and-aft spaced apart relation to the other upright portion; a hydraulic unit bridging the space between the upright portions for raising and lowering the bulldozer frame including a cylinder and an associated piston mounted in the cylinder and having a free end axially outward of the cylinder; means connecting the cylinder and the free end of the piston to the upright portions; and a rigid elongated guard member adjacent and substantially parallel to the hydraulic unit bridging the space between the upright portions having an upper and outer edge portion adjacent to the cylinder and above the upper surface of the cylinder; and means supporting the guard member on the upright portions, said latter means being self adjusting to accommodate relative movement between the upright portions upon extension or retraction of the hydraulic unit while maintaining the guard member in adjacent and parallel positions relative to the hydraulic unit.

6. A hydraulic unit assembly comprising: a pair of spaced apart relatively movable elements; a hydraulic unit extending between and selectively extendable and retractable to move said members relatively, said unit including a cylinder having a clevis connection to one element and a piston having a clevis connection to the other element; an elongated guard disposed closely parallel to said unit and of sufficient length to lie in protective relation to said unit in both extended and retracted conditions thereof, said guard having one end portion adjacent to one clevis connection and an opposite end portion overlying the other clevis connection; said one end portion of the guard having an aperture therein; means in said one clevis connection including a clevis pin passing through said aperture and also through the associated element to interconnect the unit, the guard and the associated element; and means including at least part of said other end portion of the guard and defining an opening elongated lengthwise of the path of movement of the other clevis connection for accommodating said other clevis connection as the hydraulic unit is extended and retracted.

References Cited in the file of this patent

UNITED STATES PATENTS

| | | |
|---|---|---|
| 1,923,412 | Bacon | Aug. 22, 1933 |
| 2,136,551 | Knapp | Nov. 15, 1938 |
| 2,681,518 | Troop | June 22, 1954 |
| 2,711,063 | Hill | June 21, 1955 |
| 2,732,963 | Grubich | Jan. 31, 1956 |
| 2,753,638 | Mork | July 10, 1956 |
| 2,764,303 | Austin | Sept. 25, 1956 |

FOREIGN PATENTS

| | | |
|---|---|---|
| 558,537 | Great Britain | Jan. 10, 1944 |